Oct. 13, 1964   R. S. DICKINSON ETAL   3,152,665
ADJUSTABLE HYDRAULIC SHOCK ABSORBERS
Filed Sept. 19, 1962   7 Sheets-Sheet 1

INVENTORS:
RONALD S. DICKINSON
ALAN R. A. DAY
BY
ATTORNEYS

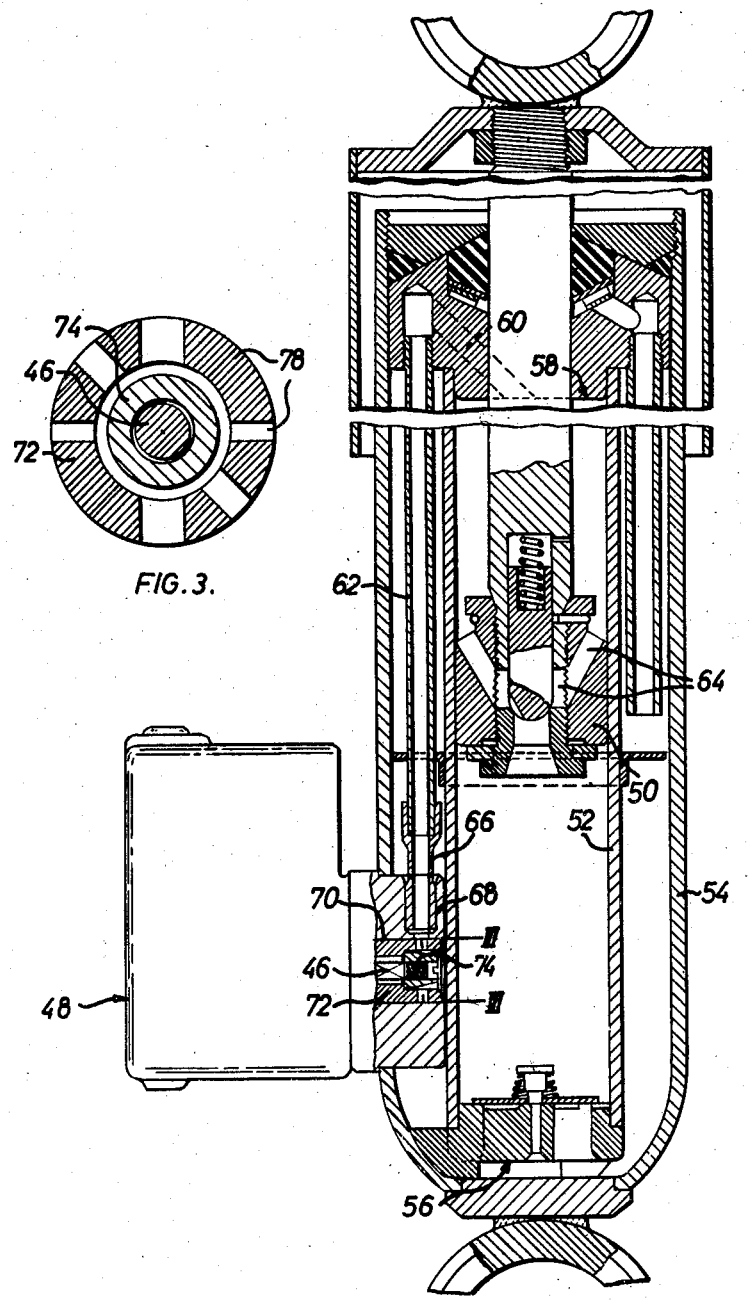

Oct. 13, 1964   R. S. DICKINSON ETAL   3,152,665
ADJUSTABLE HYDRAULIC SHOCK ABSORBERS
Filed Sept. 19, 1962   7 Sheets-Sheet 3

INVENTORS:
RONALD S. DICKINSON
ALAN R. A DAY
BY
Browne, Schuyler + Burridge
ATTORNEYS Oct. 13, 1964   R. S. DICKINSON ETAL   3,152,665
ADJUSTABLE HYDRAULIC SHOCK ABSORBERS
Filed Sept. 19, 1962   7 Sheets-Sheet 4

INVENTORS:
RONALD S. DICKINSON
ALAN R. A. DAY
BY
Browne, Schuyler + Burridge
ATTORNEYS Oct. 13, 1964    R. S. DICKINSON ETAL    3,152,665
ADJUSTABLE HYDRAULIC SHOCK ABSORBERS
Filed Sept. 19, 1962    7 Sheets-Sheet 6

INVENTORS:
RONALD S. DICKINSON
ALAN R. A. DAY
BY

ATTORNEYS

United States Patent Office 3,152,665
Patented Oct. 13, 1964

3,152,665
ADJUSTABLE HYDRAULIC SHOCK ABSORBERS
Ronald Sidney Dickinson and Alan R. A. Day, both of York, England, assignors to Armstrong Patents Co. Limited, London, England, a British company
Filed Sept. 19, 1962, Ser. No. 224,747
Claims priority, application Great Britain Sept. 21, 1961
5 Claims. (Cl. 188—88)

This invention concerns hydraulic shock absorbers which incorporate adjustable hydraulic medium flow restricting means for enabling the shock absorber damping characteristics to be varied at will to suit differing traveling conditions, and the invention relates particularly to such shock absorbers wherein the adjustable flow restricting means is a displaceable needle valve.

A number of hydraulic shock absorber constructions have already been proposed wherein a needle valve is displaceable by a control wire or cable means operable, for example, from the dashboard or other control position of a vehicle. However, especially in a road vehicle, such wire or cable control means have shown the disadvantage that under the arduous conditions of dirt and moisture which are encountered in normal vehicle use, the control means become defective, as by sticking due to the onset of rust and other corrosion.

It is an object of the invention to provide an adjustable shock absorber which avoids the foregoing disadvantages by arranging for the adjustment to be carried out electrically.

Another object of the invention resides in the provision for an adjustable hydraulic shock absorber, of electrically actuated adjustment means which are energised only whilst an adjustment is taking place, but not otherwise.

According to the present invention, in an adjustable hydraulic shock absorber having an electrically operated stepping mechanism with a driven member for controlling a displaceable restrictor member, switch means are provided for energising said stepping mechanism to advance the driven member from one position to its next succeeding position, and or de-energizing said mechanism after each such step.

The switch means may conveniently comprise a rotary control switch having a number of circularly spaced, stationary contacts corresponding to the number of positions into which the driven member is capable of being adjusted, and a rotor permanently connected with a common contact and adapted, in moving from one rest position of said rotor to the next, to make only a momentary connection with one of said stationary contacts, but to be completely isolated from said stationary contacts when it is actually situated in one of its rest positions. Such control switch preferably has its stationary contacts each connected to a corresponding stationary contact of a second rotary switch, the rotor of which is carried by said driven member and adapted to engage with one of said last-mentioned stationary contacts whenever said second rotor is placed in one of its rest positions by said driven member, the arrangement being such that the energising circuit of said stepping mechanism is completed through corresponding pairs of stationary contacts of the two switches when said pairs are momentarily connected together, and is interrupted on each occasion that the rotor of the first-mentioned switch occupies one of its rest positions.

This invention will be described further, by way of example, with reference to the accompanying drawings, in which:

FIG. 2 is a longitudinal sectional elevation of a telescopic shock absorber embodying the invention;

FIG. 3 is a transverse section, to an enlarged scale, taken on the line III—III of FIG. 1;

Figure 1:
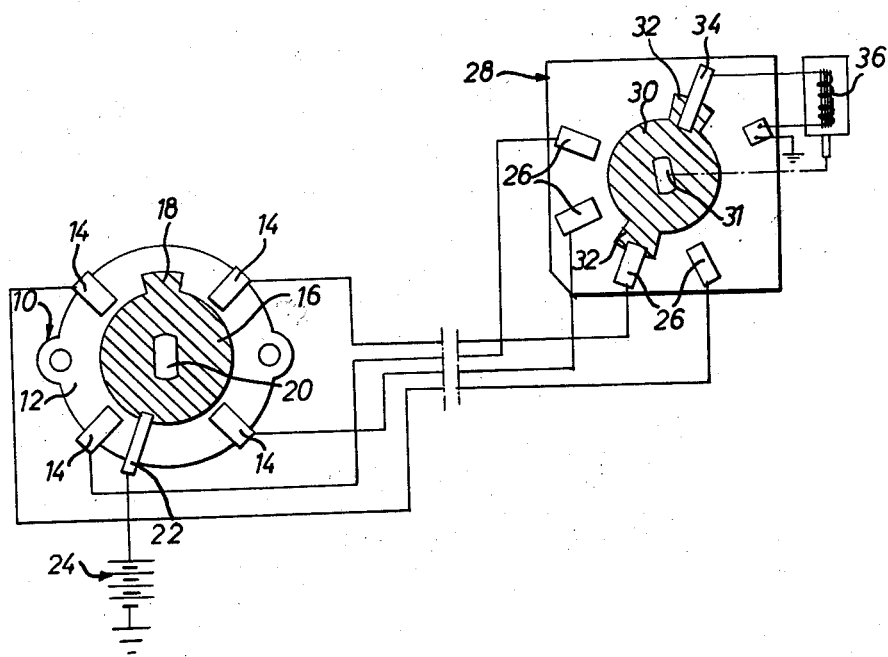
FIG. 1 is a schematic diagram illustrating the principle of operation of the invention.

Referring firstly to FIG. 1, a rotary control switch generally denoted 10 has a carrier member 12 provided with four equiangularly spaced stationary contacts 14 arranged around its periphery. Centrally of the carrier member 12, there is provided a rotor 16 having a radially projecting wiper 18 adapted to make sliding connection with successive stationary contacts 14 as the rotor is rotated. It will be noted that the angular spacing between adjacent stationary contacts 14 is greater than the width of the wiper 18 which is arranged, in each rest position of the rotor, to lie between an adjacent pair of stationary contacts. This is accomplished by mounting of the rotor 16, by means of a central slot 20, on a driving shaft (not shown) of a suitable indexing mechanism. Such indexing mechanisms are commonly used to operate rotary manual switches, for example, and often employ a dimpled detent plate and a resiliently loaded detent ball co-operating therewith, each rest position of the rotor being defined by the engagement of said ball in a dimple of the plate. Using such a mechanism, it is possible to ensure that the detent ball cannot remain intermediate two adjacent dimples in the detent plate, and hence that the wiper 18, in passing from one rest position to the next, makes only a momentary connection with the stationary contact 14 intermediate these two positions. As shown, the rotor is in permanent sliding engagement with a common contact 22 connected to the positive terminal of a battery 24 having its negative terminal connected to earth.

Figure 4:
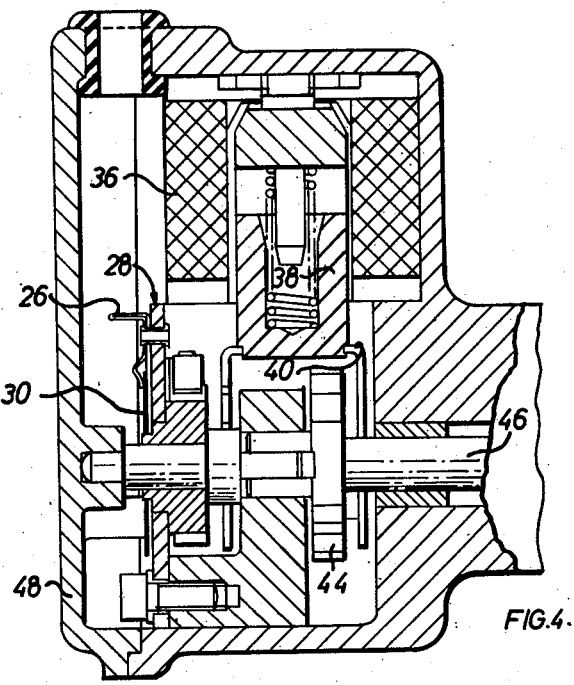
FIG. 4 is an axial section through a stepping mechanism embodying the operative principle shown in FIG. 1.
Figure 5:
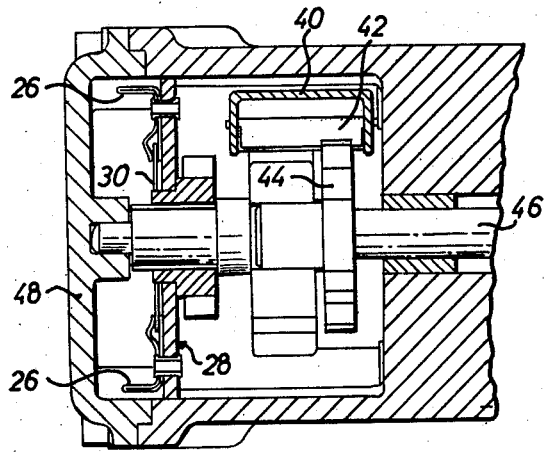
FIG. 5 is a similar section, taken in a plane perpendicular to that of FIG. 4.

Each of the stationary contacts 14 of the switch 20 is connected to a corresponding stationary contact 26 of a second rotary switch 28 having a rotor 30 with radial wipers 32 adapted to engage successive contacts 26 as the rotor 30 is rotated. The switch 28 also has a common contact 34 which is in permanent sliding engagement with the rotor 30 and which is connected to one end of a solenoid 36 of a rotary stepping mechanism, the other end of the solenoid 36 being connected to earth. As shown in FIGS. 4 and 5, the solenoid 36 is arranged to operate a plunger 38 which, at its outer end, is fitted with a pawl carrier 40 provided with pivotally attached pawls 42 which are spring-loaded to engage with the teeth of a ratchet wheel 44 received on a rotatable shaft 46. On each occasion when the solenoid 36 is energised, the plunger 38 is retracted relative to the solenoid, and one of the pawls 42 turns the ratchet wheel 44 to rotate the shaft 46. When the solenoid is de-energized, the plunger is retracted by a spring, and this extension causes a second one of the pawls 42 to engage the ratchet wheel 44 to turn the same again, and impart a further degree of rotation to the shaft 46. As applied to FIG. 1, the rotor 30 is formed with a central slot 31 by which it is carried on the rotatable shaft 46, and each operation and subsequent de-energisation of the solenoid 36 is arranged to rotate the rotor 30 so that a wiper 32 moves from one stationary contact 26 to the next.

In the shock absorber shown in FIGS. 2 and 3, the solenoid 36, the rotary stepping mechanism described above, and the switch 28 are arranged in a housing 48. The shock absorber itself comprises a piston 50 displaceable in a pressure cylinder 52, and an outer cylinder 54 surrounding the cylinder 52, the space between the two cylinders serving as a reservoir for hydraulic medium. The pressure cylinder 52 is closed at its lower end by a foot valve assembly 56 and at its upper end by an upper bearing and sealing gland assembly 58, a passage 60 being formed in this latter assembly to communicate with the interior of the pressure cylinder with a dependent tube 62 extending from the assembly 58 into the reservoir space between the two cylinders 52 and 54. The piston is formed with valved passage means 64, and following conventional practice, the valves in the piston and in the foot valve assembly are so arranged that displacement of the piston in either direction in the cylinder 52 causes hydraulic medium to move in a closed path from the reservoir space, through the foot valve assembly 56 into the end of cylinder 52 in front of the piston, through the piston and passage means 64 into the other end of cylinder 52, and through the passage 60 back into the reservoir space by way of the dependent tube 62.

A substantial degree of control over the damping characteristics of the shock absorber can be obtained by controlling the rate at which hydraulic medium passes through the dependent tube 62. It will be seen that, for this purpose, the housing 48 is fitted to the outer cylinder 54 of the shock absorber, and is radially bored at 68 and engaged with an upstanding tube 66 which receives the lower end of the dependent tube 62. The radial bore 68 joins with an axial bore 70 of the housing 48, the bore 70 constituting a valve chamber which at its outermost end is open to the shock absorber reservoir space, and within said valve chamber is arranged a sleeve 72 secured by means of an externally tapered nut 74 to the shaft 46 of the stepping mechanism. The sleeve 72 is formed with pairs of diametrically opposed and circularly spaced radial ports 78, adjacent ports having different diameters from one another, and hence the cross-sectional area available to hydraulic medium passing along the dependent tube 62 to the reservoir space is governed by the port 78 which at any instant is in register with the bore 68.

In use, when a vehicle is fitted with the shock absorbers proposed by the invention, the control switch 10 is conveniently mounted on the vehicle dashboard, and the stationary contacts 14 of switch 10 are each connected to a corresponding stationary contact 26 of the switch 28 of each shock absorber. When the setting of the shock absorber adjustment is to be changed, the rotor 16 of the switch 10 is rotated from the rest position in which it is then situated to the next rest position, and during this movement, momentarily engages with the stationary contact 14 between said two rest positions, thus momentarily connecting the solenoid 36 to the battery 24 by way of the corresponding stationary contact 26 of switch 28, the rotor 30 and common contact 34 of that switch. The stepping mechanism therefore operates and moves both the sleeve 72 and the rotor 30 into their next succeeding positions. The movement of the sleeve 72 changes the port 78 which is in register with the bore 68, thus altering the damping characteristic of the shock absorber, while the movement of the rotor 30 positions a wiper 32 on the next adjacent stationary contact 26, ready for a subsequent operation of control switch 10. At all other times, the arrangement whereby the wiper 18 of switch 10 normally lies between two stationary contacts 14 ensures that the solenoid energising circuit is interrupted, and the provision of an indexing mechanism, as mentioned above, prevents this safeguard from being deliberately ignored. Preferably, the said indexing mechanism is provided with a non-reversible drive to ensure that the angular relationship initially set between the rotors 16 and 30 is maintained, when the angular setting of the rotor 16 (as shown, for example, by the driving shaft of the indexing mechanism) always gives an indication of the hydraulic setting of the shock absorbers.

FIGS. 6 to 10 show the application of the invention to lever-type shock absorbers. The shock absorber shown in FIGS. 6 to 8 comprises a housing 100 having a hollow interior 112 serving as a reservoir for hydraulic medium, and a pair of hydraulic cylinders 114 opening at one end from the reservoir 112 and arranged in parallel, side-by-side relationship within the housing 100. A hollow piston 116 is displaceably received in each cylinder 114, and a rockable spindle 118 which extends through the reservoir space 112 above the two cylinders is journalled in the housing 100 for turning movement relative thereto. The spindle 118 carries a symmetrical crank plate 120, and a pivotally arranged connecting rod 122 extends from the crank plate 120 to each of the pistons 116.

At the bottom of the housing 100 there is formed a valve chamber 124 (FIG. 8), and bores 126 are provided to connect the bottom ends of the cylinders respectively to opposite end regions of the valve chamber. At its outer end, the chamber 124 is threaded to receive an axially bored plug 128 having a peripheral groove 130 registering with the bore 126 leading from the right-hand cylinder 114 (as viewed in FIG. 8), and the axial bore 132 of the plug is counterbored at 134 to define a valve seat 136 at the inner end of the plug. A hollow valve member 138 having a conical valve face is urged by means of a spring 140 against the seat 136, and the end of the valve member 138 within the counterbore 134 is also formed as a valve seat 142 co-operating with a second valve member 144 which is urged towards said seat by means of a spring 146. Oblique passages 148 are formed in the plug 128 to connect the groove 130 thereof with the counterbore 134.

Figure 6:
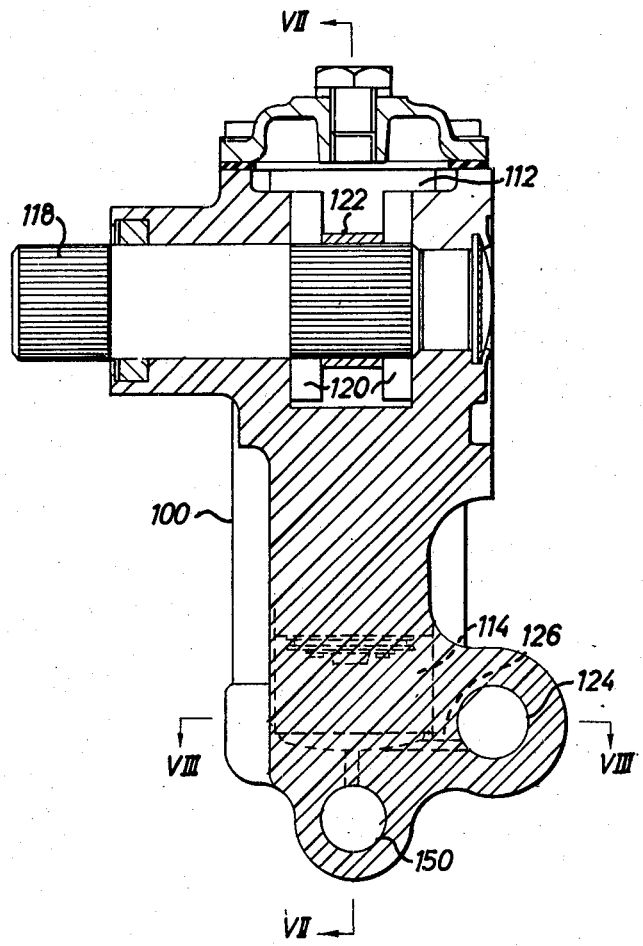
FIG. 6 is a transverse sectional elevation through a lever-type shock absorber fitted with the adjustment means of the invention.
Figure 7:
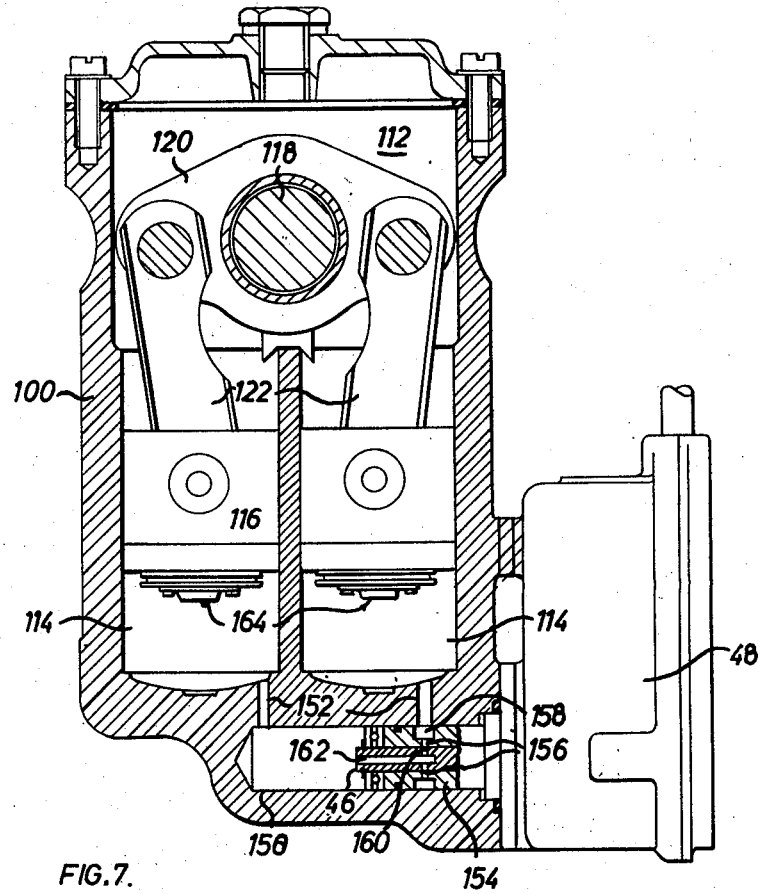
FIG. 7 is a section taken on the line VII—VII of FIG. 6.

Turning now to FIGS. 6 and 7, the shock absorber housing 100 is also formed, parallel to the valve chamber 124, with a further bore 150 likewise connected to each of the hydraulic cylinders 114 by means of a passage 152. The housing 48 containing the stepping mechanism adjustment means of the invention is, in this embodiment, slightly modified by the provision of an externally directed cylindrical spigot 154 adapted to fit within the housing bore 150 and having diametrical ports 156 therein positioned to register with one of the passages 152. The ports 156 run into peripheral grooves 158 which ensure their being placed in communication with the passages 152. The spigot 154 is axially bored to receive the shaft 46 of the stepping mechanism and the shaft 46 in turn is formed with angularly spaced, radial ports of differing diameters, similarly to the sleeve 72 of FIG. 3, two of these ports being indicated at 160 in FIG. 7. These radial ports open from an axial bore 162 of the shaft, which in turn communicates with the bore 150 of the housing 100.

Figure 8:
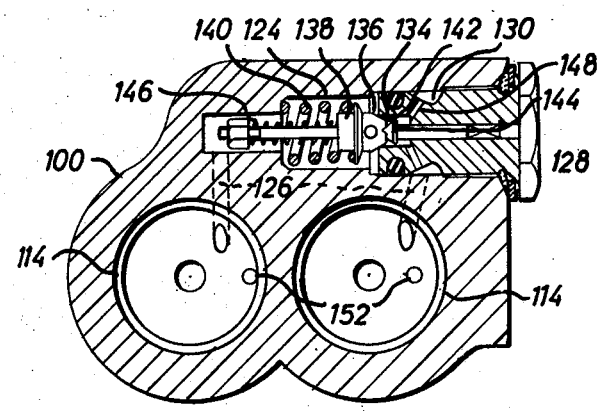
FIG. 8 is a section taken on the line VIII—VIII of FIG. 6.

In the operation of the shock absorber of FIGS. 6 to 8, with the housing 100 secured to a vehicle chassis and the shaft 118 connected externally of the housing 100 by means of a lever arm (not shown) to a suitable part of the vehicle wheel mounting, vertical oscillations of the wheel mounting arising during travel of the vehicle set up a rocking motion of the spindle 118 which causes the pistons 116 to be reciprocated in their hydraulic cylinders 114. The springs 140 and 146 which urge the valve members 138 and 144 on to their respective seats are calculated to allow these valve members to lift when subjected to pressures exceeding predetermined maximum values, and the relation between these two pressures determines the amount of damping offered to movement of the wheel mounting in one direction as compared to movement thereof in the opposite direction. In the construction illustrated, the right-hand piston 116 is subjected to compression or bump strokes of the wheel mounting, and the left-hand piston to rebound strokes, and the resistance to movement in the bump direction is arranged to be less than that to movement in the rebound direction. On each downward or compression stroke of the right-hand piston 116 in its cylinder, therefore, hydraulic medium is forced from that cylinder, through the bore 126 thereof to the peripheral groove 130 of the plug 128, and then through the oblique passages 148 of the plug into the counterbore 134, when the valve member 138 is caused to lift and permit a restricted flow of hydraulic medium past it. At the same time, the left-hand piston 116 is moving upwardly in its cylinder, and creating a suction to draw in the hydraulic medium flowing through the valve chamber 124. During the subsequent rebound movement of the wheel mounting, the flow of hydraulic medium is reversed, taking place from the left-hand cylinder to the right-hand cylinder, and the valve member 144 lifts to permit this flow, although to a still more restricted extent. In both cases, cavitation is avoided by the operation of recuperation valves (generally designated 164) in the pistons 116, and which operate if necessary to allow any deficiency of hydraulic medium in either cylinder to be made up from the reservoir 112. Such recuperation valves may, for example be ball valves carried by the pistons to permit hydraulic medium to flow through them from the reservoir into the cylinder.

In addition to the hydraulic flow path through the valve chamber 124, however, a parallel flow path, controlled by the shaft 46 is provided by the passages 152, the ports 156 and 160 and the bore 162 of the shaft 46. Thus, the resistance to fluid flow and therefore the damping characteristics of the shock absorber may be altered by operation of the stepping mechanism within the housing 48 to change the angular or rotary position of the shaft 46 and the change is, of course, the same in both the compression and the rebound directions.

Figure 9:
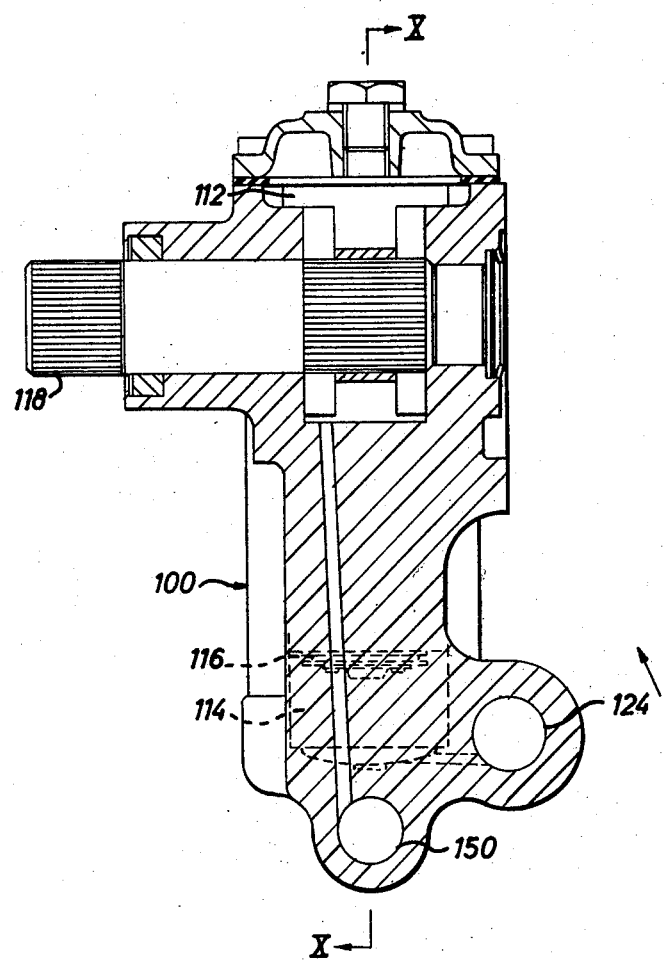
FIG. 9 is a section similar to that of FIG. 6, through a modified lever-type shock absorber.
Figure 10:
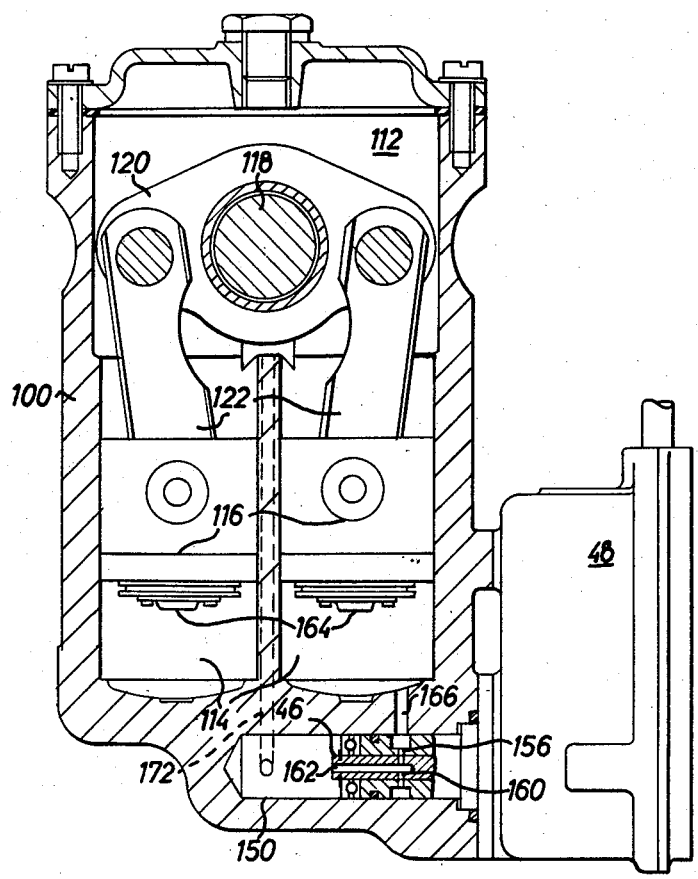
FIG. 10 is a section taken on the line X—X of FIG. 9.

A modification of the construction of FIGS. 6 to 8 whereby the resistance to fluid flow is variable in only one of these directions is shown in FIGS. 9 and 10, wherein only the right-hand cylinder 114 communicates through a passage 166 in the housing 100 and the port 156, with the ports 160 and the axial bore 162 of the shaft 46. The bore 150, however, communicates with a passage 172 formed in the housing 100 between the bore 150 and the reservoir space 112 and thus the fluid flow from the right-hand to the left-hand cylinder 114 is governed by the particular radial port of shaft 46 which at any instant registers with the port 156 so that by rotating the shaft 46, the degree of damping exerted in the right-hand cylinder may be altered. In all other respects, the construction and operation of this embodiment is identical with that of FIGS. 7 to 9.

We claim:
1. In a hydraulic shock absorber of the type comprising a body member formed with a fluid flow path for hydraulic medium, relatively movable piston and cylinder means in said flow path for displacing hydraulic medium along said flow path during operation of said shock absorber, and adjustable fluid flow restricting means including a displaceable restrictor member in said flow path for enabling the hydraulic damping characteristics of said shock absorber to be varied, the improvement comprising a solenoid operated stepping mechanism, an energising control circuit for said mechanism, a driven, rotatable shaft which is displaceable in discrete rotary steps by said stepping mechanism and which comprises sleeve valve means constituting said restrictor member, and rotary switch means in said control circuit comprising a first multiple position rotary switch including a set of circularly spaced stationary contacts corresponding in number to the number of positions into which said rotary shaft is capable of being adjusted and a rotatable switching member driven by said rotary shaft, said switching member being successively engageable with each of said stationary contacts, and a second multiple position rotary switch including a second set of stationary contacts similar to those of said first switch and a second rotatable switching member which is manually rotatable through a plurality of rest positions in each of which it is completely isolated from its co-operating stationary contacts, said second switching member being adapted to make momentary connection with successive ones of said last mentioned stationary contacts as it moves from one rest position to the next whereby said energising circuit is momentarily completed through corresponding pairs of stationary contacts of said two rotary switches whenever said pairs are momentarily connected together and is interrupted on each occasion that said second switching member assumes one of its rest positions.

2. In a telescopic hydraulic shock absorber of the type comprising a hydraulic cylinder, an apertured piston assembly telescopically arranged in said cylinder and defining a hydraulic pressure chamber at one end region of said cylinder, a hydraulic reservoir cylinder coaxially surrounding said hydraulic cylinder and co-operating with said hydraulic cylinder to define a hydraulic reservoir therearound, first passage means including first fluid flow restricting means connecting said reservoir with said pressure chamber, second fluid flow restricting means in the piston apertures, and second passage means connecting the other end region of said hydraulic cylinder with said reservoir; the improvement comprising an auxiliary housing carried by said reservoir cylinder and adjoining said second passage means, a portion extending from said housing into said reservoir space and including port means communicating with said second passage means, a solenoid operated stepping mechanism arranged in said housing, an energizing control circuit for said mechanism, a driven, rotatable shaft which is displaceable in discrete rotary steps by said stepping mechanism, said shaft passing into said extending portion, a sleeve valve carried by said shaft and formed with a plurality of radially directed and circularly spaced ports of different diameters adapted successively to register with said first-mentioned port means as said sleeve valve is rotated by said shaft, and rotary switch means in said control circuit comprising a first multiple position rotary switch including a set of circularly spaced stationary contacts corresponding in number to the number of positions into which said rotary shaft is capable of being adjusted and a rotatable switching member driven by said rotary shaft, said switching member being successively engageable with each of said stationary contacts, and a second multiple position rotary switch including a second set of stationary contacts similar to those of said first switch and a second rotatable switching member which is manually rotatable through a plurality of rest positions in each of which it is completely isolated from its co-operating stationary contacts, said second switching member being adapted to make momentary connection with successive ones of said last-mentioned stationary contacts as it moves from one rest position to the next whereby said energizing circuit is momentarily completed through corresponding pairs of stationary contacts of said two rotary switches whenever said pairs are momentarily connected together and is interrupted on each occasion that said second switching member assumes one of its rest positions.

3. In a hydraulic shock absorber of the double-acting, lever-type comprising a partly hollow body member, the hollow interior of said body member constituting a hydraulic reservoir, a pair of hydraulic cylinders each communicating at one end directly with said reservoir, a piston in each cylinder, a rockable shaft journalled in said body member and passing through said reservoir adjacent said cylinder ends, means connecting said shaft with said pistons for displacing said pistons in said cylinders responsive to turning movement of said shaft relative to said body member, said body member being formed with a valve chamber hydraulically connecting the other ends of said cylinders, and hydraulic damping valve means in said chamber for restricting the flow of hydraulic medium between said cylinders during said piston displacement, the improvement comprising a second valve chamber arranged in the path of flow of hydraulic medium from at least one of said cylinders, an auxiliary housing carried by said body member adjacent said second valve chamber and including a portion extending into said second valve chamber and presenting a port registering with the flow path between said chamber and said last-mentioned cylinder, a solenoid operated stepping mechanism in said auxiliary housing, an energizing control circuit for said mechanism, a driven rotatable shaft which is displaceable in discrete rotary steps by said stepping mechanism, said shaft passing into the extending portion of said housing and being formed with a plurality of radially directed and circularly spaced ports of different diameters adapted successively to register with said first-mentioned port as said shaft is rotated, and rotary switch means in said control circuit comprising a first multiple position rotary switch including a set of circularly spaced stationary contacts corresponding in number to the number of positions into which said rotary shaft is capable of being adjusted and a rotatable switching member driven by said rotary shaft, said switching member being successively engageable with each of said stationary contacts, and a second multiple position rotary switch including a second set of stationary contacts similar to those of said first switch and a second rotatable switching member which is manually rotatable through a plurality of rest positions in each of which it is completely isolated from its co-operating stationary contacts, said second switching member being adapted to make momentary connection with successive ones of said last-mentioned stationary contacts as it moves from one rest position to the next whereby said energizing circuit is momentarily completed through corresponding pairs of stationary contacts of said two rotary switches whenever said pairs are momentarily connected together and is interrupted on each occasion that said second switching member assumes one of its rest positions.

4. A shock absorber as set forth in claim 3, wherein said second valve chamber is arranged in parallel with the first valve chamber and hydraulically connects said other ends of said cylinders.

5. A shock absorber as set forth in claim 3, wherein said second valve chamber is arranged between said reservoir and said other end of one of said cylinders.

References Cited in the file of this patent

UNITED STATES PATENTS

| | | |
|---|---|---|
| 505,850 | Rothchild | Oct. 3, 1893 |
| 2,626,810 | Galera | Jan. 27, 1953 |
| 2,766,962 | Fodor et al. | Oct. 16, 1956 |
| 2,855,075 | Lowber | Oct. 7, 1958 |
| 3,036,808 | Fox | May 29, 1962 |

FOREIGN PATENTS

| | | |
|---|---|---|
| 221,080 | Australia | Nov. 21, 1957 |
| 387,991 | France | May 19, 1908 |
| 824,382 | France | Nov. 10, 1937 |